UNITED STATES PATENT OFFICE.

JOHN H. SCOTT, JR., AND ALBERT A. FREEMAN, OF PHILADELPHIA, PA.

METHOD OF PRESERVING OYSTERS AND SIMILAR SHELL-FISH.

SPECIFICATION forming part of Letters Patent No. 265,255, dated October 3, 1882.

Application filed March 2, 1882. (No specimens.)

*To all whom it may concern:*

Be it known that we, JOHN H. SCOTT, Jr., and ALBERT A. FREEMAN, both citizens of the United States, residing at the city and county of Philadelphia, and State of Pennsylvania, have invented a certain new and useful method of preparing oysters, clams, and similar mollusks for transportation and preservation in the shell, of which the following is a specification.

It is well known that under ordinary conditions oysters and other shell-fish, after being kept some time, open their shells and the juices escape, the animals lose their flavor, die, and shortly become unfit for use. If taken from the shell when fresh or shipped packed in ice, a certain flavor is lost.

The object of our invention is to prepare such shell-fish in a manner that they shall retain their liquors and juices in their shells, be preserved alive for a considerable time, and be readily transported in such natural and fresh condition. We attain this by binding the shells firmly together while the oyster or other mollusk is fresh or alive by means of a wire or wires made to embrace the shells between which the animal is contained, the ends of the wire being secured by being twisted or otherwise; or any other suitable clamping device which will accomplish the end in view may be used.

It is obvious that treated in this manner the animal cannot open its shell, nor can it be opened accidentally in the process of handling or transportation, for even though its bill be broken, the oyster itself, when its shells are kept together, uses suction power to retain and prevent the escape of its juices. Consequently the oyster or other shell-fish, with the surrounding juices, is kept practically tight, and they cannot escape until the clamp is removed.

We are aware of attempts having been made to accomplish the same purpose by dipping in paraffine, wax, &c.; but this fails from the fact that it makes them air-tight, the fact being overlooked that they must have air to be kept alive; also, the method of packing in barrels with concave shell underneath; but a turning of the barrel or package permits the liquor or juice to escape, and they soon die.

Having thus described our invention, what we claim as new, and desire to secure by Letters Patent, is—

The method of preparing oysters and other shell-fish for preservation and shipment, which consists in holding the shells thereof firmly clamped together while the animals are in natural condition by means of a binding-wire secured around the same, or equivalent clamping device, substantially as and for the purposes set forth.

JNO. H. SCOTT, JR.
ALBERT A. FREEMAN.

Witnesses:
HENRY J. SCOTT,
JUNIUS H. DAVIS.